United States Patent
Chopra et al.

(10) Patent No.: US 7,432,027 B2
(45) Date of Patent: Oct. 7, 2008

(54) DUAL-LAYER PROTECTED TRANSIENT DOCUMENT

(75) Inventors: Naveen Chopra, Oakville (CA); Gabriel Iftime, Mississauga (CA); Peter M. Kazmaier, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 72 days.

(21) Appl. No.: 11/093,965

(22) Filed: Mar. 30, 2005

(65) Prior Publication Data
US 2006/0222972 A1 Oct. 5, 2006

(51) Int. Cl.
*G03F 7/00* (2006.01)
*G03C 11/00* (2006.01)

(52) U.S. Cl. .......... 430/19; 430/270.1; 430/273.1; 430/332; 430/345; 430/962

(58) Field of Classification Search ............ 430/270.1, 430/19, 962, 332, 345, 273.1
See application file for complete search history.

(56) References Cited

U.S. PATENT DOCUMENTS

| | | | |
|---|---|---|---|
| 3,871,886 A * | 3/1975 | Robillard ............ 430/334 |
| 3,961,948 A | 6/1976 | Saeva |
| 4,287,337 A * | 9/1981 | Guglielmetti et al. ......... 544/6 |
| 4,405,733 A * | 9/1983 | Williams et al. ............ 524/87 |
| 5,426,018 A * | 6/1995 | Hibino et al. ............ 430/345 |
| 5,466,654 A | 11/1995 | Akutsu et al. |
| 5,473,068 A * | 12/1995 | Krongauz et al. ............ 544/71 |
| 5,641,724 A * | 6/1997 | Yamaguchi et al. ......... 503/221 |
| 5,710,420 A | 1/1998 | Martin et al. |
| 5,782,969 A * | 7/1998 | Takagi ................ 106/498 |
| 6,103,431 A * | 8/2000 | Tamaoki et al. ............ 430/20 |
| 6,329,035 B1 * | 12/2001 | Iwasaki et al. ............ 428/64.1 |
| 6,350,431 B1 * | 2/2002 | Snow et al. ............... 424/9.6 |
| 6,358,655 B1 * | 3/2002 | Foucher et al. ......... 430/108.21 |
| 6,365,312 B1 * | 4/2002 | Foucher et al. ......... 430/108.21 |
| 6,432,610 B1 * | 8/2002 | Rentzepis et al. ........ 430/270.15 |
| 6,500,245 B1 | 12/2002 | McCue et al. |
| 6,517,618 B2 | 2/2003 | Foucher et al. |
| 6,590,082 B1 | 7/2003 | Banning et al. |
| 6,646,101 B2 | 11/2003 | Kratschmer et al. |
| 6,663,703 B1 | 12/2003 | Wu et al. |
| 6,673,139 B1 | 1/2004 | Wu et al. |
| 6,815,679 B2 * | 11/2004 | Azuma .................. 250/316.1 |
| 7,214,456 B2 * | 5/2007 | Iftime et al. ................ 430/19 |
| 7,229,740 B2 * | 6/2007 | Iftime et al. ............ 430/270.1 |

FOREIGN PATENT DOCUMENTS

JP 2003-131339 5/2003

OTHER PUBLICATIONS

U.S. Appl. No. 10/834,722, filed Apr. 29, 2004 entitled "Reimageable Medium", Iftime et al.

(Continued)

*Primary Examiner*—Amanda C. Walke
(74) *Attorney, Agent, or Firm*—Pepper Hamilton LLP

(57) ABSTRACT

A reimageable medium including a transparent substrate having a first side and any opposing side, a protective layer and an imaging layer. The protective layer can be located on the first side of the transparent substrate and the imaging layer can be located on the opposing side of the transparent substrate.

28 Claims, 4 Drawing Sheets

OTHER PUBLICATIONS

U.S. Appl. No. 10/835,518, filed Apr. 29, 2004 entitled "Method for Forming Temporary Image", Kazmaier et al.
U.S. Appl. No. 10/834,529, filed Apr. 29, 2004 entitled "Reimageable Medium With Light Absorbing Material", Iftime et al.

H. Hattori et al., "Development of Paper-like Rewritable Recording Media and System", Asia Display / IDW '01, pp. 15-18 (2001).
Henri Bouas-Laurent et al., "Organic Photochromism," Pure Appl. Chem., vol. 73, No. 4, pp. 639-665 (2001).

* cited by examiner

DUAL-LAYER PROTECTED TRANSIENT DOCUMENT

BACKGROUND

Copending Application U.S. application Ser. No. 10/834,722 pending, filed Apr. 29, 2004, entitled "Reimageable Medium", with the named inventors, Gabriel Iftime, Naveen Chopra, Peter M. Kazmaier, the disclosure of which is totally incorporated herein by reference, discloses a reimageable medium composed of: a substrate; and a photochromic material, wherein the medium is capable of exhibiting a color contrast and an absence of the color contrast, wherein the medium has a characteristic that when the medium exhibits the absence of the color contrast and is then exposed to an imaging light corresponding to a predetermined image to result in an exposed region and a non-exposed region, the color contrast is present between the exposed region and the non-exposed region to form a temporary image corresponding to the predetermined image that is visible for a visible time, wherein the medium has a characteristic that when the temporary image is exposed to an indoor ambient condition for an image erasing time, the color contrast changes to the absence of the color contrast to erase the temporary image in any of the following: (i) when the indoor ambient condition includes darkness at ambient temperature, (ii) when the indoor ambient condition includes indoor ambient light at ambient temperature, and (iii) when the indoor ambient condition includes both the darkness at ambient temperature and the indoor ambient light at ambient temperature, and wherein the medium is capable of undergoing multiple cycles of temporary image formation and temporary image erasure.

Copending Application U.S. application Ser. No. 10/835,518 pending, filed Apr. 29, 2004, entitled "Method for Forming Temporary Image", with the named inventors, Peter M. Kazmaier and Gabriel Iftime, the disclosure of which is totally incorporated herein by reference, discloses an image forming method composed of: (a) providing a reimageable medium composed of a substrate and a photochromic material, wherein the medium is capable of exhibiting a color contrast and an absence of the color contrast; (b) exposing the medium to an imaging light corresponding to a predetermined image to result in an exposed region and a non-exposed region, wherein the color contrast is present between the exposed region and the non-exposed region to allow a temporary image corresponding to the predetermined image to be visible for a visible time; (c) subjecting the temporary image to an indoor ambient condition for an image erasing time to change the color contrast to the absence of the color contrast to erase the temporary image without using an image erasure device; and (d) optionally repeating procedures (b) and (c) a number of times to result in the medium undergoing a number of additional cycles of temporary image formation and temporary image erasure.

Copending Application U.S. application Ser. No. 10/834,529 pending, filed, Apr. 29, 2004 entitled "Reimageable Medium With Light Absorbing Material", with the named inventors, Gabriel Iftime, Peter M. Kazmaier, James Mayo and Paul Smith, the disclosure of which is totally incorporated herein by reference, discloses a reimageable medium for receiving an imaging light having a predetermined wavelength, the medium composed of: a substrate; a photochromic material capable of reversibly converting among a number of different forms, wherein one form has an absorption spectrum that overlaps with the predetermined wavelength scope; and a light absorbing material exhibiting a light absorption band with an absorption peak, wherein the light absorption band overlaps with the absorption spectrum of the one form.

1. Technical Field

The description set forth herein relates generally to a reimageable medium. More particularly, the description relates to a reimageable medium having a dual-layered structure that prevents noticeable coloration from ambient ultraviolet light.

2. Description of Related Art

Many paper documents are promptly discarded after being read. Although paper is inexpensive, the quantity of discarded paper documents is enormous and the disposal of these discarded paper documents raises significant cost and environmental issues. One solution to address this problems is the use of temporary documents or reimageable paper as described in the following documents: (1) Henri Bouas-Laurent et al., "Organic Photochromism," *Pure Appl. Chem.*, Vol. 73, No. 4, pp. 639-665 (2001); (2) Martin et al., U.S. Pat. No. 5,710,420; (3) McCue et al., U.S. Pat. No. 6,500,245 B1; (4) Japanese Laid Open Patent Document No. 2003-131339 ("Reversible Image Display Medium, Method and Device"); (5) H. Hattori et al., "Development of Paper-like Rewritable Recording Media and Systems," *Asia Display/IDW* '01, pp. 15-18 (2001); (6) Saeva, U.S. Pat. No. 3,961,948; (7) Foucher et al., U.S. Pat. No. 6,358,655 B1; and (8) Foucher et al., U.S. Pat. No. 6,365,312.

Reimageable paper contains a written image, which can then be erased, allowing the paper to be re-written with a new image. For example, photochromic self-erasing, reimageable paper may be written by using ultraviolet (UV) light of about 365 nm wavelength. This allows printed information to be readable by ultraviolet light and visible light for a predetermined period of time, for example, 4 hours. After an extended period of time, for example, 20 hours, the printed information is self-erasing, leaving a blank document ready to be reimaged with new information. Because light is used both for writing (UV), as well as for reading the document (UV and visible including room-light from a bulb or sun-light), unimaged areas of the document are sensitive to the UV component of the reading light. Unimaged areas become colored after a period of time in turn reducing the contrast between the white and colored states. The lack of contrast minimizes and produces poor readability of the document.

One solution to reduce the background coloration, for example, the coloration of the unimaged areas, of temporary documents may be to use a switchable protective photochromic material overcoated onto a writing or imaging layer. However, the intermixing of the overcoating and writing layers may result in poor coverage, and non-uniform protection. Additionally, the presence of a UV absorbing protective layer may reduce the UV writing efficiency on the imaging layer itself, thereby causing the written areas to be faint in color, and quick to fade under intense sunlight. A similar result may be seen when using a multilayer coating, for example, an absorbing protecting layer over an imaging layer.

Accordingly a need exists for a transient document which is reimageable and self-erasing that provides superior writeability and stability against exposure to ultraviolet light.

SUMMARY

An embodiment includes a reimageable medium. The reimageable medium includes a substrate with a first side and an opposing side, a protective layer, and an imaging layer. The protective layer can be located on the first side of the substrate and the imaging layer can be located on the opposing side of the substrate.

The substrate may be translucent, particularly transparent. Examples of the substrate include a plastic sheet, coated photo paper and the like. The imaging layer may include a photochromic material, for example, a spiropyran, a merocyanine, or both the spiropyran and the merocyanine which are reversibly convertible with each other. The protective layer may include an ultraviolet light absorbing layer and include ultraviolet light absorbing materials. The protective layer may also in addition to ultraviolet light absorbing materials include a yellow colorant, dye or pigment. The protective layer preferably absorbs light in the ultraviolet region and blue light region, for example, light having a wavelength of up to about 475 nm.

An embodiment includes a reimageable medium for receiving an imaging light. The medium includes a substrate with a first side and an opposing side, an imaging layer and a protective layer. The protective layer may be located on the first side of the substrate. The imaging layer may be located on the opposing side of the substrate and includes photochromic material capable of reversibly converting among a number of different forms. The medium may be capable of exhibiting a color contrast and an absence of the color contrast. The medium may have a characteristic that when the medium exhibits the absence of the color contrast and is then exposed to the imaging light corresponding to a predetermined image to result in an exposed region and a non-exposed region, the color contrast is present between the exposed region and the non-exposed region to form a temporary image corresponding to the predetermined image that is visible for a visible time.

The medium may be capable of undergoing multiple cycles of temporary image formation and temporary image erasure. Additionally, when the temporary image is exposed to an indoor ambient condition for an image erasing time, the color contrast may change to the absence of the color contrast to erase the temporary image in any of the following: (i) when the indoor ambient condition includes darkness at ambient temperature, (ii) when the indoor ambient condition includes indoor ambient light at ambient temperature, and (iii) when the indoor ambient condition includes both the darkness at ambient temperature and the indoor ambient light at ambient temperature.

The substrate may be transparent and the imaging light may be ultraviolet light. The imaging layer may include a photochromic material and the protective layer may include ultraviolet light absorbing material and optionally at least one of a yellow colorant, dye or pigment. The protective layer may have an absorption across the entire ultraviolet spectrum, and even up to about 400 nm to about 450 nm.

There is also provided in embodiments an image forming process. The method includes generating a two-sided medium including a substrate with an imaging layer and a protective layer on opposing sides of the substrate. The medium may be reimageable on the imaging layer and may be capable of exhibiting a color contrast and an absence of the color contrast. The medium may then be exposed to an imaging light corresponding to a predetermined image to result in an exposed region and a non-exposed region so that the color contrast may be present between the exposed region and the non-exposed region to allow a temporary image corresponding to the predetermined image to be visible for a visible time. The temporary image may then be subjected to an indoor ambient condition for an image erasing time to change the color contrast to the absence of the color contrast to erase the temporary image without using an image erasure device. The two latter steps may be repeated a number of times to result in the medium undergoing a number of additional cycles of temporary image formation and temporary image erasure.

DETAILED DESCRIPTION

Figure 1:
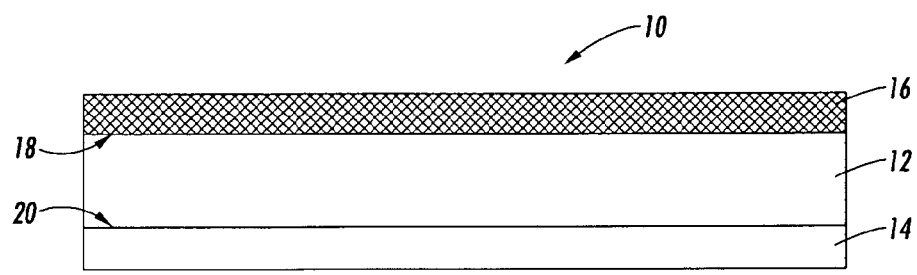
FIG. 1 illustrates a reimageable medium in accordance with the disclosure.

The term "image" as used in "predetermined image" and "temporary image" can be any marking that a person wishes to view where the "image" can be, for example, words, numbers, a picture, graphics, or a combination thereof. The terms "reimageable medium" may be used interchangeably with "medium", "transient document" and "temporary document."

The term "ambient temperature" refers to a temperature ranging from about 15° C. to 30° C.

The disclosure is generally related to a reimageable medium that, in embodiments, may have improved writeability properties and stability against UV exposure. In particular, the disclosure is directed to a transparent reimageable document with a dual layer configuration.

In an embodiment, a reimageable medium 10 includes a substrate 12, an imaging layer 14, and a light absorbing or protective layer 16. The substrate 12 includes a first side 18 and an opposing side 20. The imaging layer 14 is located on the opposing side 20 of the substrate 12. The protective layer 16 is located on the first side 18 of the substrate 12. The reimageable medium 10 may also optionally include a binder.

In embodiments, the substrate 12 can be transparent. The substrate 12 may also be a translucent material, however a clearer substrate results in better clarity. The substrate may be made of a flexible material and may be composed of any suitable material such as plastics, paper, fabrics, textile products, polymeric films, inorganic substrates, and the like. The plastic may be, for example, a plastic film, such as polyethylene film, polyethylene terepthalate, polyethylene napthalate, polystyrene, polycarbonate, polyethersulfone. The substrate may be a single layer or multi-layer where each layer can be the same or can be different material. The substrate may have a thickness ranging, for example, from about 0.01 mm to about 5 mm.

In embodiments, the substrate 12 (and the reimageable medium 10) may include any number of sides such as two (e.g., a sheet of plastic), three, four or more sides (e.g., a cube). When one is trying to determine the number of sides of the substrate/medium, it is helpful to consider the intended use of the medium. For example, where the substrate/medium has the configuration of a folder (of the kind for holding loose papers) but the folder is laid relatively flat when viewing the temporary image which stretches across the entire viewing surface, the transparent substrate/medium may be thought of as having two sides (front and back sides). In embodiments, the side can have a curved shape. It is understood that the number of reimageable sides of the medium may be the same as or fewer than the number of sides of the transparent substrate; for example, when the substrate is a sheet of paper and the photochromic material is present only on one side of the paper, then the reimageable medium has only one reimageable side even though the substrate is two-sided. Also, for any reimageable side of the medium, the entire side or alternatively only a portion of the side may be reimageable.

The substrate 12 and reimageable medium 10 may be rigid or flexible. In fact, the substrate/reimageable medium may have any suitable rigidity or flexibility depending on the intended use for the reimageable medium. In embodiments, the substrate/reimageable medium is capable of undergoing a number of cycles of being rolled up/folded and then unrolled/unfolded. The substrate/reimageable medium has any suitable size such as the dimensions of a business card, the dimensions of a sheet of paper (e.g., A4 or letter sized), cardboard sheet or larger, and the like. The substrate/reimageable medium may have any suitable shape such as planar (e.g., a sheet) or non-planar (e.g., cube, scroll, and a curved shape). In embodiments, a plurality of reimageable mediums can also be combined to form a larger reimageable surface analogous to a giant display screen composed of a number of smaller display screens.

The imaging layer 14 is located on the opposing side 20 of the substrate 12. The imaging layer 14 includes photochromic display material. The photochromic material exhibits photochromism which is a reversible transformation of a chemical species induced in one or both directions by absorption of electromagnetic radiation between two forms having different absorption spectra. The first form is thermodynamically stable which can be induced by absorption of light to convert to a second form. The back reaction from the second form to the first form can occur, for example, thermally or by absorption of light. Embodiments of the photochromic material also encompass the reversible transformation of the chemical species among three or more forms in the event it is possible that reversible transformation can occur among more than two forms. The photochromic material may be composed of one, two, three or more different types of photochromic materials, where the term "type" refers to each family of reversibly interconvertible forms, e.g., spiropyran and its isomer merocyanine collectively forming one type (also referred to as one family) of photochromic material. Unless otherwise noted, the term "photochromic material" refers to all molecules of the photochromic material regardless of form. For example, where the photochromic material is of a single type such as spiropyran/merocyanine, at any given moment the molecules of the photochromic material may be entirely spiropyran, entirely merocyanine, or a mixture of spiropyran and merocyanine. In embodiments, for each type of photochromic material, one form is colorless or weakly colored and the other form is differently colored.

When two or more types of photochromic materials are present, each type may be present in an equal or unequal amount by weight ranging, for example, from about 5% to about 95% based on the weight of all types of the photochromic material. In embodiments, the photochromic material may also be thermochromic, i.e., exhibits thermochromism which is a thermally induced reversible color change.

Any suitable photochromic material may be used, especially an organic photochromic material. Examples of suitable photochromic materials include compounds that undergo heterocyclic cleavage, such as spiropyrans and related compounds; compounds that undergo homocyclic cleavage such as hydrazine and aryl disulfide compounds; compounds that undergo cis-trans isomerization such as azo compounds, stilbene compounds and the like; compounds that undergo proton or group transfer phototautomerism such as photochromic quinines; compounds that undergo photochromism via electro transfer such as viologens and the like; and others.

As discussed herein, the photochromic material may exist in a number of forms. Some examples of the photochromic material include spiropyrans compounds, for example, spiro[2H-1-benzopyran-2,2'-indolines]; spirooxazines, for example, spiro[indoline-2,3'-[3H]-naphtho[2,1-b]-1,4-oxazines]; and spirothiopryans, for example, spiro[2H-1-benzothiopyran-2,2'-indolines].

Other classes of suitable photochromic materials include stilbenes, aromatic azo compounds, benzo and naphthopyrans (chromenes), bisimidazoles, spirodihydroindolizines and related systems (tetrahydro- and hexahydroindolizine), photochromic quinines, perimidinespirocyclohexadienones, photochromic viologens, fulgides and fulgimides, diarylethenes, triarylmethanes, and anils. While the above classes of compounds have been identified, the examples of photochromic compounds are not limited to just these compounds, but also include the analogue compounds and the like.

The light absorbing or protective layer 16 is located on the first side 18 of the substrate 12. The protective layer 16 includes light absorbing materials, particularly ultraviolet absorbing material and blue light absorbing material. The protective layer 16 may also include yellow colorant, dyes or pigments in addition to the light absorbing materials. The protective layer 16 reduces chemical degradation of the components of the reimageable medium 10 due to exposure to ambient conditions, especially any chemical reaction involving the photochromic material and oxygen. For example, protective layer 16 may prevent stray ultraviolet light from causing additional background coloring, i.e. writing, onto the imaging layer on the opposing side of the substrate as described in further detail below. In embodiments, the protective layer 16 may also reduce physical deterioration of the reimageable medium due to, for example, handling/scratching.

For example, in the absence of the light absorbing material, indoor ambient light over a period of time may cause in embodiments the photochromic material in the non-exposed region (that is, not exposed to the imaging light) to undergo the interconversion to the different form where the color of the non-exposed region may match or be similar to the color of the exposed region, thereby causing fading or erasure of the temporary image by the reduction in the color contrast. Incorporating the light absorbing material into the reimageable medium reduces or minimizes this problem.

Thus, the protective layer reduces stray light of wavelengths where the colorless state of the imaging layer absorbs. Protective layer 16 prevents coloration of the unimaged background or non-exposed region of the imaging layer. The protective layer has a high absorption in the entire UV region of the spectrum, for example, wavelengths below about 400 nm, where the colorless state of the photoimaging layer absorbs. Some photochromic compounds may also have absorption in the blue region of the light spectrum when they are in the unimaged or non-exposed state. The blue region of the light spectrum is defined for the purpose of this disclosure from about 400 nm to about 475 nm. The protective layer may also include a yellow color in the unimaged or non-exposed state.

In this case, for example, it is important to provide protection in the protective layer for the blue region of the spectrum of light. Therefore, a protective compound which is yellow, for example, is needed in addition to the ultraviolet light absorbing protective compound for maximum protection.

Any suitable light absorbing materials for the protective layer 16 may be used, for example, acrylates such as Tinuvin® 360 (from Ciba Specialty Chemicals, Inc.), a dimeric 2-hydroxy benzotriazole UV absorber, which has high absorption of light below about 400 nm. Organic molecules and polymeric materials useful for the light absorbing material, a number of which possess high absorbance below the predetermined wavelength scope, are now described. Examples of organic compounds which may be useful for the light absorbing material include 2-hydroxy-phenones, like for example, 2,4-diyhdroxyphenone, 2-(2-hydroxy-5-tert-octylphenyl) benzotriazole, 2-hydroxy-4-n-octoxybenzophenone, 2-(2'-hydroxy-3',5'-di-tert-amylphenyl) benzotriazole, azobenzene derivatives like for example, azobenzene, 4-ethyl azobenzene, 2-chloro-azobenzene, and 4-phenylazobenzene.

Specific examples of organic aromatic conjugated compounds, a number of which may absorb below the predetermined wavelength scope, include, for example, nitro-benzene, 4-methoxy-benzonitrile, anthracene, anthraquinone, 1-chloro-anthracene and the like.

Some of these light absorbing materials are commercially available, for example, at Mayzo (BLS®531; BLS®5411; BLS®1710), Ciba (TINUV®234, TINUV® P, TINUV® 1577) and are typically used in UV protective layer to prevent photochemical degradation of polymeric coatings. Other suitable examples of UV absorbing materials include Lowilite® series available at Great Lakes Polymer Additives, such as benzotriazole UV absorbers, like for example, Lowilite® 26, Lowilite® 55 and others. Alternatively, they may be benzophenone absorbers similar to, for example, Lowilite® 20, Lowilite®24 as well as others.

Yellow colorants, particularly yellow, dyes and yellow pigments, useful for the light absorbing material may in embodiments possess strong absorption in the region of the light spectrum of from about 400 nm to about 475 nm. Any yellow colorants dyes and pigments are suitable for the purpose of this invention. Azo pyridone yellow dyes, as disclosed in U.S. Pat. Nos. 6,673,139; 6,663,703; 6,646,101; and 6,590,082 may be suitable, the disclosures of which are totally incorporated herein by reference. The azo pyridone yellow dyes may possess in embodiments very low absorption below 370 nm but high absorption above this wavelength. These azo pyridone yellow dyes can be comprised of either mono-pyridone and mono-anthranilate; dipyridone and bis anthranilate; or dianthranilate and bis-pyridone. Yellow pigment may be, for example, DCC 7155 and DCC 7251, available at Dominion Color Corporation, Toronto, Canada.

The light absorbing material may be composed of one, two, three or more different light absorbing materials. When two or more different light absorbing materials are present, each light absorbing material may be present in an equal or unequal amount by weight ranging, for example, from about 5% to about 95%, in a particular embodiment from about 30% to about 50%, based on the weight of all light absorbing materials. The light absorbing material may be in the form of a separate layer over the photochromic material. In another embodiment, the light absorbing material and the photochromic material form a single layer over the substrate. In a further embodiment, the light absorbing material and the photochromic material are both impregnated or embedded into a porous substrate such as paper. When the light absorbing material is present in a separate layer, a binder can be optionally used with the light absorbing material in the separate layer where the binder and the light absorbing material are each present in an equal or unequal amount by weight, each ranging, for example, from about 5% to about 95% by weight, in a particular embodiment from about 30% to about 50% by weight, based on the weight of the binder and the light absorbing material.

The reimageable medium 10 may also include a binder. For example, the protective layer and/or the imaging layer may be dispersed in a polymeric binder, particularly a transparent binder. The role of the binder may be that of a suspending medium to hold the photochromic material as a film or layer on a transparent substrate of interest. The desired properties of the binder may be any or all of the following: mechanical flexibility, robustness, and optical clarity. In embodiments, the binder may not be highly crystalline or light scattering so that the imaging light can image the photochromic material, and the temporary images are of sufficient contrast. Moreover, in embodiments, the binder may be a solid, nonvolatile material that will not be removed from the substrate.

Any suitable binder may be used such as a polymer material. Examples of polymer materials that can be used as binders include: polycarbonates, polystyrenes, polysulfones, polyethersulfones, polyarylsulfones, polyarylethers, polyolefins, polyacrylates, polyvinyl derivatives, cellulose derivatives, polyurethanes, polyamides, polyimides, polyesters, silicone resins, and epoxy resins and the like. Copolymer materials such as polystyrene-acrylonitrile, polyethylene-acrylate, vinylidenechloride-vinylchloride, vinylacetate-vinylidene chloride, styrene-alkyd resins are also examples of suitable binder materials. The copolymers may be block, random, or alternating copolymers.

The binder may be composed of one, two, three or more different binders. When two or more different binders are present, each binder may be present in an equal or unequal amount by weight ranging, for example, from about 5% to about 95%, particularly from about 30% to about 50%, based on the weight of all binders.

There is also provided in an embodiment, an image forming method. The method includes providing a two-sided medium including a transparent substrate having an imaging layer and a protective layer on opposing sides of the transparent substrate. The medium may be reimageable on the imaging layer and may be capable of exhibiting a color contrast and an absence of the color contrast. The medium may then be exposed to an imaging light corresponding to a predetermined image to result in an exposed region and a non-exposed region so that the color contrast may be present between the exposed region and the non-exposed region to allow a temporary image corresponding to the predetermined image to be visible for a visible time. The temporary image may then be subjected to an indoor ambient condition for an image erasing time to change the color contrast to the absence of the color contrast to erase the temporary image without using an image erasure device. The two latter steps may be repeated a number of times to result in the medium undergoing a number of additional cycles of temporary image formation and temporary image erasure.

The imaging light which writes an image on the medium may have any suitable predetermined wavelength scope of a single wavelength or a band of wavelengths. In embodiments, the imaging light may be an ultraviolet light having a single wavelength or a narrow band of wavelengths selected from the ultraviolet light wavelength range of about 200 nm to about 475 nm, in particular embodiments, a single wavelength at about 365 nm or a wavelength band of about 360 nm to about 420 nm. For each temporary image, the reimageable medium may be exposed to the imaging light for a time period ranging from about 10 milliseconds to about 5 minutes, in particular embodiments from about 30 milliseconds to about 1 minute. The imaging light may have an intensity ranging from about 0.1 mW/cm$^2$ to about 100 mW/cm$^2$, preferably from about 0.5 mW/cm$^2$ to about 10 mW/cm$^2$.

In embodiments, imaging light corresponding to the predetermined image may be generated, for example, by a computer on a Light Emitting Diode (LED) array screen and the temporary image may be formed on the reimageable medium by placing the medium on the LED screen for the preferred period of time. UV LED arrays of, for example, about 396 nm, are produced by EXFO (Mississauga, ON, Canada). Another suitable procedure for generating the imaging light corresponding to the predetermined image may be with the use of UV Raster Output Scanner (ROS).

The color contrast to render the temporary image visible to an observer may be a contrast between, for example, two, three or more different colors. The term "color" encompasses a number of aspects such as hue, lightness, and saturation where one color can be different from another color if the two colors differ in at least one aspect. For example, two colors having the same hue and saturation but are different in lightness would be considered different colors. Any suitable colors (e.g., red, white, black, gray, yellow and purple) may be used to produce the color contrast as long as the temporary image is visible to the naked eye.

In embodiments, the color contrast may change (e.g., diminish) during the visible time, but the phrase "color contrast" encompasses any degree of color contrast sufficient to render a temporary image discernable to the observer regardless whether the color contrast changes or is constant during the visible time.

The visible time for the temporary image ranges, for example, from about 1 hour to about 5 days, or from about 3 hours to about 24 hours. In embodiments, fading of the temporary image (due to a decrease in the color contrast) may be noticeable within the visible time described herein, but the visible time indicates the time period at which the temporary image may be discernable to the naked eye.

In use, an image is erased from the reimageable medium by subjecting the temporary image to an indoor ambient condition for an image erasing time to change the color contrast to the absence of the color contrast and erase the temporary image. This can occur without the use of an image erasure device. The temporary image may thus be visible for a visible time sufficient for an observer to view the temporary image. The visible time however may be limited to allow for the optional feature of repeating the procedure described herein for temporary image formation and temporary image erasure a number of times to result in the medium undergoing a number of additional cycles of temporary image formation and temporary image erasure. Accordingly, in embodiments, the reimageable medium may be considered "self-erasing."

In embodiments of the method and the reimageable medium of the disclosure, erasure of the temporary image may occur by any of the following: (i) changing the color of the exposed region (that is, exposed to the imaging light) to the color of the non-exposed region (that is, not exposed to the imaging light); (ii) changing the color of the non-exposed region to the color of the exposed region; or (iii) changing the color of the exposed region and of the color of the non-exposed region to the same color different from both the exposed region color and the non-exposed region color.

The medium can have a characteristic that when the temporary image is exposed to an indoor ambient condition for an image erasing time, the color contrast changes to the absence of the color contrast to erase the temporary image in all of the following: (i) when the indoor ambient condition includes darkness at ambient temperature, (ii) when the indoor ambient condition includes indoor ambient light at ambient temperature, and (iii) when the indoor ambient condition includes both the darkness at ambient temperature and the indoor ambient light at ambient temperature.

The indoor ambient condition may be composed of darkness at ambient temperature, or indoor ambient light at ambient temperature, or both the darkness at ambient temperature and the indoor ambient light at ambient temperature. The indoor ambient light is, for example, the typical office lighting where the indoor ambient light may be entirely artificial light (e.g., light from an incandescent bulb and/or fluorescent bulb), or entirely sunlight coming in through a glass window, or a mixture of artificial light and sunlight coming through a glass window. Where the indoor ambient condition includes darkness at ambient temperature, the term "darkness" refers to a low light level where the office lighting is turned off and where there is insignificant amount of sunlight entering the room (e.g., there is no window or the sun has set or the window drapes/blinds are closed). The term "darkness" also encompasses the nighttime situation where the office lighting is turned off, but there are "city lights" streaming into the room through the window. In embodiments of the present method, the reimageable medium with the temporary image is exposed to the indoor ambient condition for an image erasing time ranging, for example, from about 1 hour to about 5 days, or from about 3 hours to about 24 hours. In embodiments, since the temporary image typically remains under an indoor ambient condition during the entire visible time, the image erasing time includes the visible time. For example, if the temporary image is visible for 5 hours, then the image erasing time may be any value of 5 plus hours. In embodiments, the image erasing time exceeds the visible time by a time period of, for example, at least about 30 minutes, or from about 1 hour to about 24 hours.

In embodiments, the medium may have an additional characteristic that the color contrast changes to the absence of the color contrast to erase the temporary image in the following: (iv) when the medium is exposed to an elevated temperature generated by an image erasure device. In embodiments, the medium may have another characteristic that the color contrast changes to the absence of the color contrast to erase the temporary image in the following: (v) when the medium is exposed to an image erasure light generated by an image erasure device.

In embodiments, the reimageable medium may be capable of any suitable number of cycles of temporary image formation and temporary image erasure ranging, for example, from about 5 cycles to about 1,000 cycles, or from about 10 cycles to about 100 cycles, without significant chemical degradation of the photochromic material and the other components. In embodiments of the process of the disclosure, after undergoing the initial cycle of temporary image formation and temporary image erasure, the reimageable medium optionally undergoes a number of additional cycles of temporary image formation and temporary image erasure ranging from 1 additional cycle to about 1,000 additional cycles, or from 3 additional cycles to about 100 additional cycles. When there is a plurality of cycles of temporary image formation and temporary image erasure, each temporary image may be the same or different from each other, and each temporary image may be present on the same or different region of the reimageable medium.

In embodiments of the method, it may be optional to use an image erasure device. However, other aspects of the present invention may also include the reimageable medium itself and the reimageable medium in embodiments may optionally have characteristics as described herein that allow it to be used with an image erasure device. The optional image erasure device may be any suitable device that causes erasure of the temporary image by inducing a portion of the photochromic material to change to a different form having a different color (such as from purple to yellow, or from purple to colorless where colorless is considered a color in this context). The image erasure device may be, for example, a heating device capable of generating an elevated temperature (any suitable temperature above the ambient temperature) ranging, for example, from about 50° C. to about 200° C. such as, for example, an oven or a hot air blower device. The optional image erasure device may be an artificial light source which generates an image erasure light having a broad band, a narrow band, or a single wavelength within a wavelength range of, for example, about 200 nm to about 700 nm. The image erasure device may be operated for any effective time period such as a time period ranging, for example, from about 10 seconds to about 1 hour, or from about 30 seconds to about 30 minutes.

The following discussion of general operational principles (involving exemplary embodiments) provides further information on various aspects of the present invention. For simplicity of discussion, the photochromic material is composed of only one type. In embodiments, a side of the reimageable medium may initially have the same color where the molecules of the photochromic material are all of the same first form. The imaging light directed towards a selected region of the reimageable medium causes the photochromic material in the exposed region to change to a different second form which has a different color. There then exists a color contrast between the exposed region and the non-exposed region to allow a temporary image to be visible to an observer. It is noted that the color of the exposed region and the color of the non-exposed region seen by the observer may be a combination of a number of colors including, for example, the color of the substrate, the color of the photochromic material in that region, and the color of any other optional component. Where the first form of the photochromic material is colorless, then the color of the non-exposed region may be primarily determined by the color of the substrate. When the temporary image erases on its own under an indoor ambient condition, the interconversion of the second form of the photochromic material to the first form in the exposed region may be due to thermal absorption (ambient temperature), or to light absorption (indoor ambient light), or to a combination thereof. It is understood that the indoor ambient conditions of indoor ambient light (at ambient temperature) and darkness (at ambient temperature) can be combined in the context that they can be used sequentially in any order.

The disclosure will now be described with respect to an exemplary embodiment and disclosure thereof, it being understood that this example is intended to be illustrative only and the disclosure is not intended to be limited to the materials, conditions, or process parameters recited herein. All percentages and parts are by weight unless otherwise indicated. As used herein, "PMMA" refers to polymethyl methacrylate. The example was conducted at ambient temperature. In the examples, a mask having text (transparent areas) and black areas was used for imaging the reimageable medium. The transparent areas (letters of the text) will produce text (colored) after exposure to the UV imaging light.

Embodiments of the present invention may provide numerous advantages. The separation of the protecting and imaging layers offers superior writeability and stability against UV exposure over multilayered or mixed protective-photochromic schemes.

EXAMPLE

Figure 2:
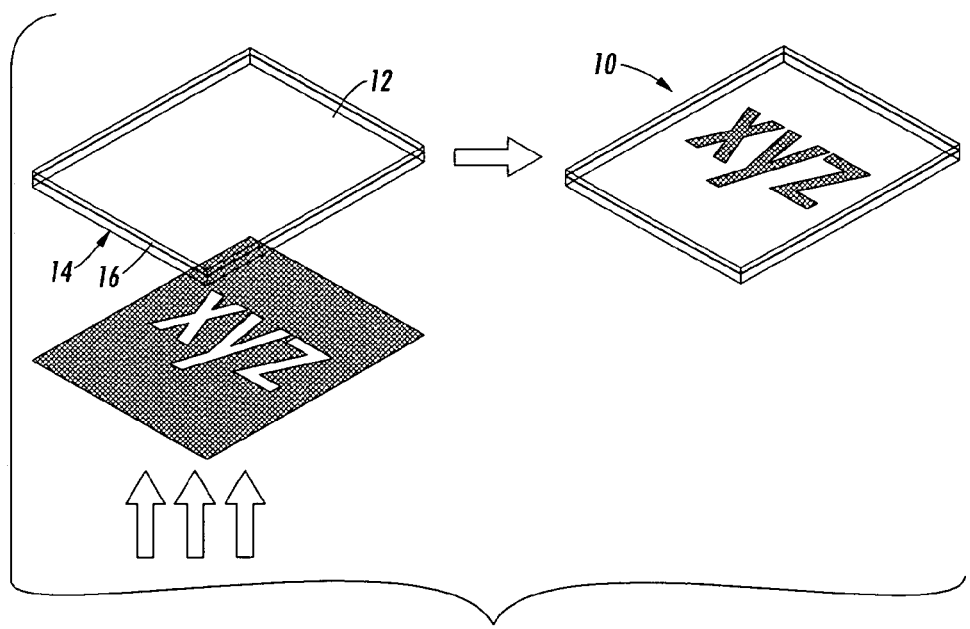
FIG. 2 illustrates a writing scheme in accordance with an embodiment of the disclosure.

A PET transparent sheet was first coated with the imaging layer including a solution of spiropyran dissolved in 22% (w/w) PMMA in xylenes at a concentration of 30 mg/mL using an automatic coater fitted with 4 mil doctor blade. The solvent was allowed to evaporate leaving a thin film. The sheet was turned over, and a 4 mil protective layer coating containing Tinuvin 360 dissolved in PMMA/xylenes at 10 mg/mL was applied. Next, the imaging layer of the dual sided film was backed with a shadow mask and irradiated for about 1 minute with high intensity UV light (about 365 nm 4 m $W/cm^2$) to write the image as seen in FIG. 2. After the image was written, the document was kept face down with the UV light absorbing protective layer facing up. The transparency of the sheet, allowed the information to be read.

Figure 3:
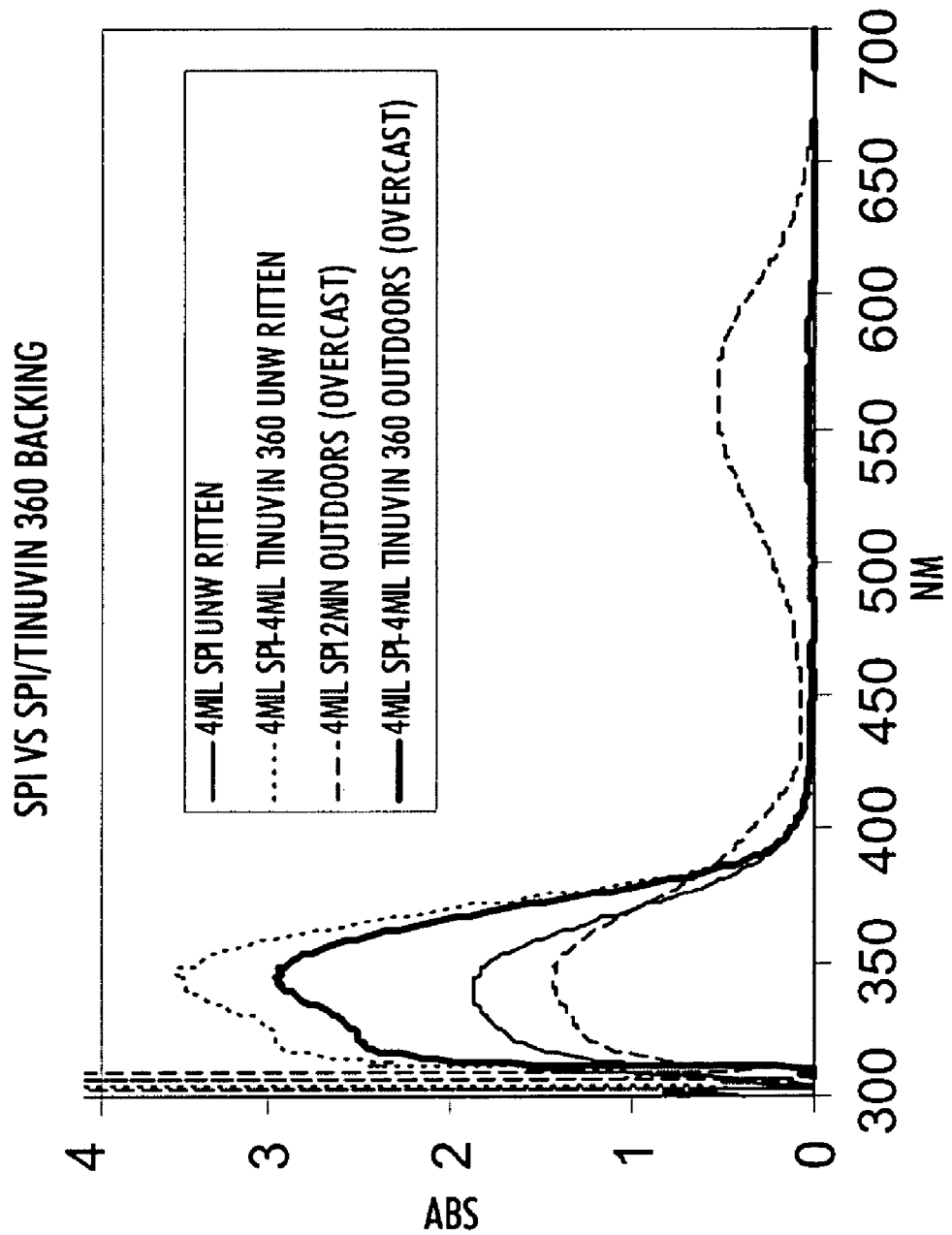
FIG. 3 illustrates a graph of UV light absorption in a reimageable medium with and without a protective layer.

Test squares of masked and unmasked areas were measured after exposure to an outdoor environment by UV/VIS (ultraviolet/visible) spectroscopy. FIG. 3 shows a graph of absorbance versus wavelength for the following samples: (i) 4 mil SPI unwritten represents unwritten film without a protective layer, (ii) 4 mil SPI-4 mil Tinuvin 360 unwritten represents an unwritten film with a protective layer, (iii) 4 mil SPI 2 minutes outdoors (overcast) represents a written film without a protective layer, and (iv) 4 mil SPI-4 mil Tinuvin 360 outdoors represents a written film with a protective layer. As can be seen, both sample films (ii) and (iv) with a protective layer demonstrate better absorption results than films (i) and (iii) which have no protective layer. The effectiveness of the protective Tinuvin film was clearly evident by the negligible absorbance as shown by sample film (iv) of about 0.038 at 560 nm in FIG. 3. For the unprotected sample film (iii), the absorbance of 0.534 was much higher at 560 nm.

Figure 4A:
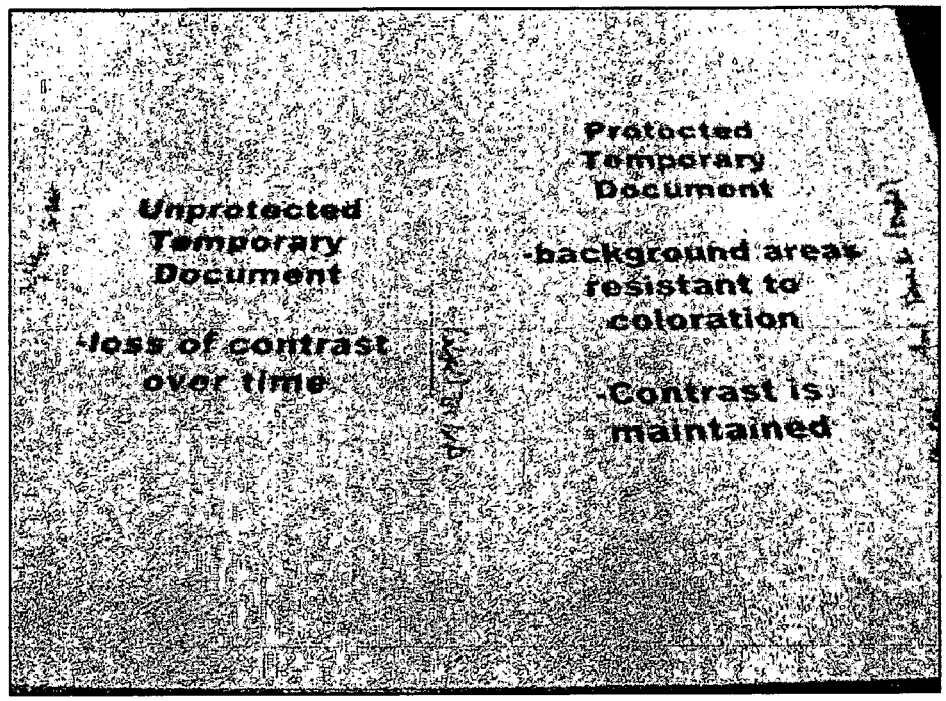
FIG. 4a illustrates a comparison of unprotected reimageable mediums with protected reimageable mediums in accordance with the disclosure, after initial UV writing.
Figure 4B:
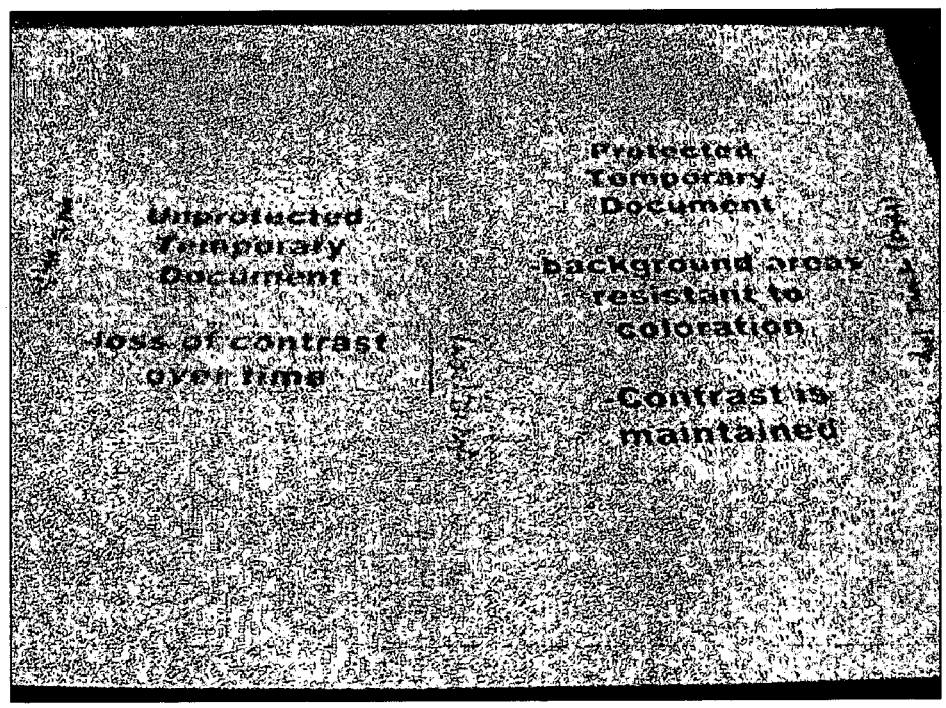
FIG. 4b illustrates a comparison of unprotected reimageable mediums with protected reimageable mediums in accordance with the disclosure, after 2 minutes of outdoor exposure.
Figure 4C:
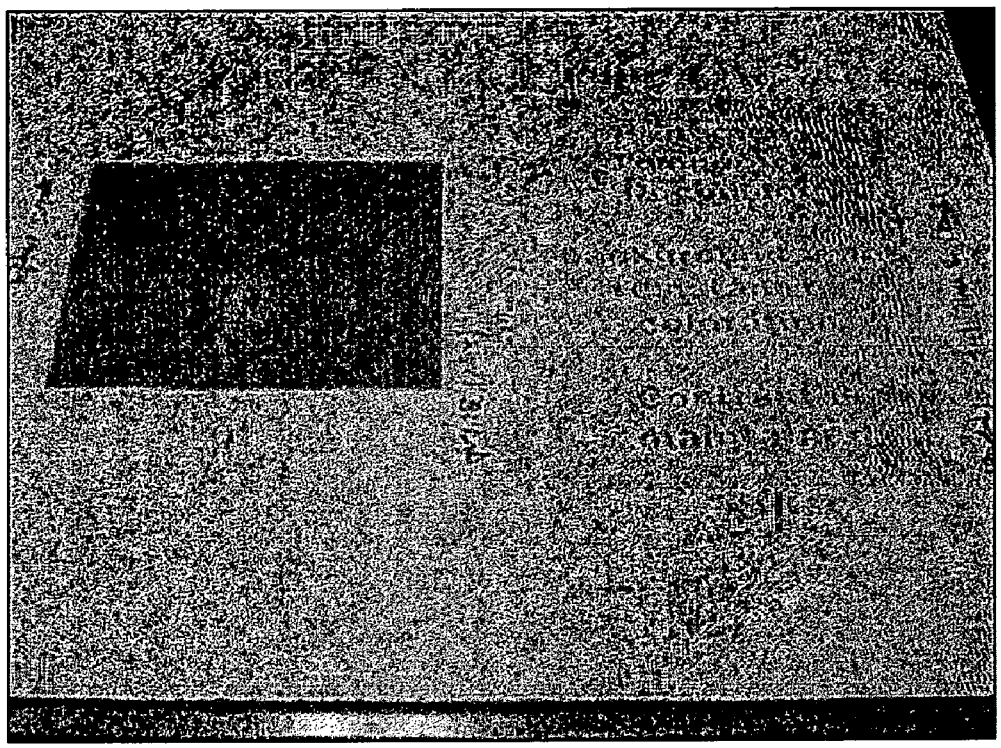
FIG. 4c illustrates a comparison of unprotected reimageable mediums with protected reimageable mediums in accordance with the disclosure, after 1 minute of direct sunlight exposure.

As an illustration of the dramatic effect of a film with a protective layer including a UV absorber materials, photographs were taken of the written films immediately after UV writing and after 2 minutes of outdoor exposure to an overcast sky. FIG. 4a shows an unprotected written document and a protected document immediately after UV writing. FIG. 4b shows an unprotected written document and a protected written document after 2 minutes of outdoor exposure with an overcast sky. As seen in FIG. 4b, it was evident that the unprotected written document was already fading and there was a loss of contrast between the written area and the non-written area, i.e. there was coloration of the background, in comparison to the protected written document. To further demonstrate the effectiveness of the Tinuvin UV light absorber protective layer, the documents were exposed after 1 minute to direct sunlight where the incidence of UV light is greatest. As shown in FIG. 4c, in direct sunlight, the unprotected document was entirely colored, but the protected document in accordance with the disclosure was still legible. Thus, the protective layer prevented stray ultraviolet light from reaching the imaging layer and provided a stable document against coloration from ambient light.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A reimageable medium comprising:
   a substrate having a first side and an opposing side;
   a protective layer including at least one ultraviolet light absorbing material; and
   an imaging layer,
   wherein the imaging layer comprises a photochromic material capable of being written on by an imaging light having a wavelength in the range of about 200 nm to about 475 nm, and
   wherein the protective layer is located on the first side of the substrate and the imaging layer is located on the opposing side of the substrate.

2. The reimageable medium according to claim 1, wherein the substrate is transparent.

3. The reimageable medium according to claim 1, wherein the substrate comprises plastic.

4. The reimageable medium according to claim 1, wherein the protective layer further comprises at least one of a yellow colorant, dye or pigment.

5. The reimageable medium according to claim 1, wherein the protective layer absorbs light having a wavelength up to about 475 nm.

6. The reimageable medium according to claim 1, wherein the reimageable medium is self erasing.

7. The reimageable medium according to claim 1, wherein the photochromic material changes from a first form to a second form by absorption of an electromagnetic radiation having a wavelength of about 360 nm.

8. The reimageable medium according to claim 1, wherein the photochromic material changes from a first form to a second form by absorption of an electromagnetic radiation having a wavelength band of about 360 not to about 420 nm.

9. The reimageable medium of claim 1, wherein the protective layer prevents coloration of a non-exposed region of the imaging layer by a stray light having a wavelength that is absorbed by a colorless state of the photochromic material.

10. The reimageable medium according to claim 1, wherein the photochromic material comprises a spiropyran, a merocyanine, or both the spiropyran and the merocyanine which are reversibly convertible with each other.

11. The reimageable medium according to claim 1, wherein the photochromic material changes from a first form to a second form by absorption of an electromagnetic radiation having a wavelength between about 200 nm to about 475 nm.

12. An image forming process comprising:
   (a) providing a medium comprising a substrate having an imaging layer and a protective layer including at least one ultraviolet light absorbing material on opposing sides of the substrate, wherein the imaging layer comprises a photochromic material, wherein the medium is reimageable on the imaging layer, wherein the medium is capable of exhibiting a color contrast and an absence of the color contrast;
   (b) exposing the medium to an imaging light having a wavelength in the range of about 200 nm to about 475 nm, wherein said imagining light corresponds to a predetermined image to result in an exposed region and a non-exposed region, and wherein the color contrast is present between the exposed region and the non-exposed region to allow a temporary image corresponding to the predetermined image to be visible for a visible time; and
   (c) subjecting the temporary image to an indoor ambient condition for an image erasing time to change the color contrast to the absence of the color contrast to erase the temporary image.

13. The process according to claim 12, further comprising the step of optionally repeating procedures (b) and (c) a number of times to result in the medium undergoing a number of additional cycles of temporary image formation and temporary image erasure.

14. The process according to claim 12, wherein the substrate is transparent.

15. The process according to claim 12, wherein the protective layer comprises an ultraviolet light absorbing layer and optionally at least one of yellow color, dye or pigment.

16. The process according to claim 12, wherein the imaging light comprises ultraviolet light.

17. The process of claim 12, wherein the protective layer prevents coloration of a non-exposed region of the imaging layer by a stray light having a wavelength that is absorbed by a colorless state of the photochromic material.

18. The process according to claim 12, wherein the photochromic material comprises a spiropyran, a merocyanine, or both the spiropyran and the merocyanine which are reversibly convertible with each other.

19. The process according to claim 12, wherein the photochromic material changes from a first form to a second form by absorption of an electromagnetic radiation having a wavelength between about 200 nm to about 475 nm.

20. A reimageable medium for receiving an imaging light, the medium comprising:
   a substrate having a first side and an opposing side;
   a protective layer located on the first side of the substrate, comprising an ultraviolet light absorbing material; and
   an imaging layer located on the opposing side of the substrate, comprising photochromic material capable of reversibly converting among different forms when exposed to an imaging light having a wavelength in the range of about 200 nm to about 475 nm,
   wherein the medium is capable of exhibiting a color contrast and an absence of the color contrast,
   wherein the medium has a characteristic that when the medium exhibits the absence of the color contrast and is then exposed to the imaging light corresponding to a predetermined image to result in an exposed region and a non-exposed region, the color contrast is present between the exposed region and the non-exposed region to form a temporary image corresponding to the predetermined image that is visible for a visible time, and
   wherein the medium has a characteristic that when the temporary image is exposed to an indoor ambient condition for an image erasing time, the color contrast changes to the absence of the color contrast to erase the temporary image.

21. The reimageable medium according to claim 20, wherein the medium is capable of undergoing multiple cycles of temporary image formation and temporary image erasure.

22. The reimageable medium according to claim 20, wherein when the temporary image is exposed to an indoor ambient condition for an image erasing time, the color contrast changes to the absence of the color contrast to erase the temporary image in each of the following: (i) when the indoor ambient condition includes darkness at ambient temperature, (ii) when the indoor ambient condition includes indoor ambient light at ambient temperature, and (iii) when the indoor ambient condition includes both the darkness at ambient temperature and the indoor ambient light at ambient temperature.

23. The reimageable medium of claim 20, wherein the substrate is transparent and the imaging light is ultraviolet light.

24. The reimageable medium according to claim 20, wherein the protective layer further comprises at least one of a yellow colorant, dye or pigment.

25. The reimageable medium according to claim 20, wherein the photochromic material changes from a first form to a second form by absorption of an electromagnetic radiation having a wavelength between about 200 nm to about 475 nm.

26. The reimageable medium according to claim 20, wherein the photochromic material changes from a first form to a second form by absorption of an electromagnetic radiation having a wavelength band of about 360 nm to about 420 nm.

27. The reimageable medium of claim 20, wherein the protective layer prevents coloration of the non-exposed region of the imaging layer by a stray light having a wavelength that is absorbed by a colorless state of the photochromic material.

28. The reimageable medium according to claim 20, wherein the photochromic material comprises a spiropyran, a merocyanine, or both the spiropyran and the merocyanine which are reversibly convertible with each other.

* * * * *